United States Patent
Norikane et al.

(10) Patent No.: US 10,557,018 B2
(45) Date of Patent: Feb. 11, 2020

(54) THREE-DIMENSIONAL OBJECT FORMING LIQUID, THREE-DIMENSIONAL OBJECT FORMING LIQUID SET, THREE-DIMENSIONAL OBJECT PRODUCING METHOD, AND THREE-DIMENSIONAL OBJECT

(71) Applicants: Yoshihiro Norikane, Kanagawa (JP); Ichiroh Fujii, Kanagawa (JP); Hiroshi Iwata, Kanagawa (JP)

(72) Inventors: Yoshihiro Norikane, Kanagawa (JP); Ichiroh Fujii, Kanagawa (JP); Hiroshi Iwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 37 days.

(21) Appl. No.: 16/024,938

(22) Filed: Jul. 2, 2018

(65) Prior Publication Data

US 2018/0312664 A1 Nov. 1, 2018

Related U.S. Application Data

(62) Division of application No. 14/876,055, filed on Oct. 6, 2015, now Pat. No. 10,066,082.

(30) Foreign Application Priority Data

Oct. 16, 2014 (JP) ................................. 2014-211658
Jun. 16, 2015 (JP) ................................. 2015-120796

(51) Int. Cl.
| | | |
|---|---|---|
| B29C 64/124 | (2017.01) | |
| B29C 64/112 | (2017.01) | |
| B29C 64/40 | (2017.01) | |
| B29C 64/129 | (2017.01) | |
| B29C 64/106 | (2017.01) | |
| C08K 5/41 | (2006.01) | |
| B29K 105/00 | (2006.01) | |
| B29L 31/00 | (2006.01) | |
| B33Y 10/00 | (2015.01) | |
| B33Y 80/00 | (2015.01) | |
| B33Y 70/00 | (2020.01) | |

(52) U.S. Cl.
CPC .............. *C08K 5/41* (2013.01); *B29C 64/106* (2017.08); *B29C 64/112* (2017.08); *B29C 64/124* (2017.08); *B29C 64/129* (2017.08); *B29C 64/40* (2017.08); *B29K 2105/0002* (2013.01); *B29K 2105/0005* (2013.01); *B29K 2105/0061* (2013.01); *B29K 2995/007* (2013.01); *B29L 2031/7532* (2013.01); *B33Y 10/00* (2014.12); *B33Y 70/00* (2014.12); *B33Y 80/00* (2014.12)

(58) Field of Classification Search
CPC .......... C08K 5/41; B33Y 80/00; B33Y 70/00; B33Y 10/00; B29L 2031/7532; B29K 2995/007; B29K 2105/0061; B29K 2105/0005; B29K 2105/0002; B29C 64/40; B29C 64/135; B29C 64/129; B29C 64/124; B29C 64/112; B29C 64/106
See application file for complete search history.

(56) References Cited

U.S. PATENT DOCUMENTS

| | | |
|---|---|---|
| 6,259,962 B1 | 7/2001 | Gothait |
| 2005/0053798 A1* | 3/2005 | Maekawa ............... B29C 64/40 428/542.8 |
| 2005/0069572 A1 | 3/2005 | Williams et al. |
| 2006/0237880 A1 | 10/2006 | Wicker et al. |
| 2014/0113989 A1* | 4/2014 | Messersmith ....... A61L 24/0031 523/118 |
| 2016/0046072 A1 | 2/2016 | Rolland |
| 2016/0107381 A1 | 4/2016 | Krishnan |

FOREIGN PATENT DOCUMENTS

| | | |
|---|---|---|
| JP | 2007-508058 A | 4/2007 |
| JP | 2007-241170 | 9/2007 |
| JP | 4366538 | 9/2009 |
| JP | 4530351 | 6/2010 |
| JP | 4759165 | 6/2011 |
| JP | 4908679 | 1/2012 |
| JP | 5270360 | 5/2013 |
| JP | 2015-136895 | 7/2015 |
| JP | 2015-138192 | 7/2015 |

OTHER PUBLICATIONS

Office Action dated May 7, 2019 in corresponding Japanese Patent Application No. 2015-120796, 7 pages.

\* cited by examiner

*Primary Examiner* — Christopher M Rodd
(74) *Attorney, Agent, or Firm* — Oblon, McClelland, Maier & Neustadt, L.L.P.

(57) ABSTRACT

Provided is a three-dimensional object producing method, including: a first step of forming a film by delivering a first liquid as a hydrogel precursor including at least a multi-functional monomer; and a second step of curing the film formed in the first step, wherein the first step and the second step are repeated a plurality of times.

7 Claims, 4 Drawing Sheets

THREE-DIMENSIONAL OBJECT FORMING LIQUID, THREE-DIMENSIONAL OBJECT FORMING LIQUID SET, THREE-DIMENSIONAL OBJECT PRODUCING METHOD, AND THREE-DIMENSIONAL OBJECT

CROSS REFERENCE TO RELATED APPLICATIONS

This application is a Divisional of U.S. application Ser. No. 14/876,055, filed Oct. 6, 2015, now pending.

BACKGROUND OF THE INVENTION

Field of the Invention

The present invention relates to a three-dimensional object forming liquid, a three-dimensional object forming liquid set, a three-dimensional object producing method, and a three-dimensional object.

Description of the Related Art

In recent years, there have been proposed inkjet stereolithography techniques of forming a three-dimensional object by forming an image at a necessary portion of the object by an inkjet method using a liquid photo-curable resin, and stacking up layers of such images. In the inkjet stereolithography techniques, there is proposed a method of simultaneously forming a support member made of a different material from that of a three-dimensional object to prevent deformation or fall of the three-dimensional object during three-dimensional formation thereof (see, e.g., Japanese Patent (JP-B) Nos. 4366538 and 4908679).

Recently, there have been increasing needs for gel-state or soft three-dimensional objects having stereoscopic fine structures, such as medical organ models and scaffoldings for cells used in regenerative medicine. However, there have not yet been provided three-dimensional object producing methods that can reproduce complicated fine structures from three-dimensional data. Particularly, organ models used for medical procedure trainings, etc. include complicated internal structures such as vessel structures such as blood vessels inside the organs, and tumor portions, and it is very difficult to produce such organ models with molds.

SUMMARY OF THE INVENTION

An object of the present invention is to provide a three-dimensional object producing method that can produce complicated fine three-dimensional objects represented by organ models, etc. easily and efficiently.

A three-dimensional object producing method of the present invention as a means for solving the problem described above includes:

a first step of forming a film by delivering a first liquid as a hydrogel precursor including at least a multifunctional monomer; and a second step of curing the film formed in the first step, wherein the first step and the second step are repeated a plurality of times.

The present invention can provide a three-dimensional object producing method that can produce complicated fine three-dimensional objects represented by organ models, etc. easily and efficiently.

Figure 1A:
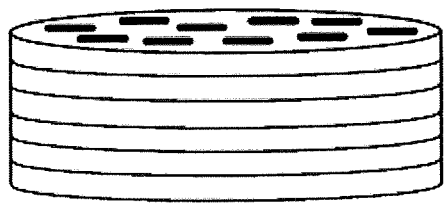
FIG. 1A is an exemplary diagram illustrating an example of a layered mineral

DETAILED DESCRIPTION OF THE INVENTION (Three-Dimensional Object Forming Liquid (First Liquid))

A three-dimensional object forming liquid of the present invention, i.e., a first liquid used in a three-dimensional object producing method of the present invention includes a hydrogel precursor, and further includes other components according to necessity.

<Hydrogel Precursor>

The hydrogel precursor includes at least a multifunctional monomer, preferably includes water, an organic solvent, a layered mineral, a monofunctional monomer, and a polymerization initiator, and further includes other components according to necessity.

—Multifunctional Monomer—

The multifunctional monomer is a compound having two or more unsaturated carbon-carbon bonds, and preferably an active energy ray-curable monomer. Examples thereof include bifunctional monomers, trifunctional monomers, and trifunctional or greater monomers.

It is preferable that a homopolymer of the multifunctional monomer be water-soluble. In the present invention, the homopolymer of the multifunctional monomer is referred to as being water-soluble when, for example, the homopolymer (1 g) is mixed in water (100 g) having a temperature of 30° C. and stirred, 90% by mass or greater of the homopolymer dissolves.

Examples of the bifunctional monomers include tripropylene glycol di(meth)acrylate, triethylene glycol di(meth)acrylate, tetraethylene glycol di(meth)acrylate, polypropylene glycol di(meth)acrylate, neopentyl glycol hydroxy pivalic acid ester di(meth)acrylate (MANDA), hydroxy pivalic acid neopentyl glycol ester di(meth)acrylate (HPNDA), 1,3-butane diol di(meth)acrylate (BGDA), 1,4-butane diol di(meth)acrylate (BUDA), 1,6-hexanediol di(meth)acrylate (HDDA), 1,9-nonanediol di(meth)acrylate, diethylene glycol di(meth)acrylate (DEGDA), neopentyl glycol di(meth)acrylate (NPGDA), tripropylene glycol di(meth)acrylate (TPGDA), caprolactone-modified hydroxy pivalic acid neopentyl glycol ester di(meth)acrylate, propoxylated neopentyl glycol di(meth)acrylate, ethoxy-modified bisphenol A di(meth)acrylate, polyethylene glycol 200 di(meth)acrylate, polyethylene glycol 400 di(meth)acrylate, and methylene bis acrylamide. One of these may be used alone, or two or more of these may be used in combination.

Examples of the trifunctional monomers include trimethylol propane tri(meth)acrylate (TMPTA), pentaerythritol tri(meth)acrylate (PETA), triallyl isocyanate, tris(2-hydroxy ethyl)isocyanurate tri(meth)acrylate, ethoxylated trimethylol propane tri(meth)acrylate, propoxylated trimethylol propane tri(meth)acrylate, and propoxylated glyceryl tri(meth)acrylate. One of these may be used alone, or two or more of these may be used in combination.

Examples of the trifunctional or greater monomers include pentaerythritol tetra(meth)acrylate, ditrimethylol propane tetra(meth)acrylate, dipentaerythritol hydroxy penta(meth)acrylate, ethoxylated pentaerythritol tetra(meth) acrylate, penta(meth)acrylate ester, and dipentaerythritol hexa(meth)acrylate (DPHA). One of these may be used alone, or two or more of these may be used in combination.

A content of the multifunctional monomer is preferably from 0.001% by mass to 1% by mass, and more preferably from 0.01% by mass to 0.5% by mass relative to the whole amount of the three-dimensional object forming liquid. When the content is in the range of from 0.001% by mass to 1% by mass, elastic modulus and hardness of the hydrogel to be obtained can be adjusted to adequate ranges.

—Water—

The water may be, for example, pure water or ultrapure water such as ion-exchanged water, ultrafiltrated water, reverse osmotic water, and distilled water. Other components such as an organic solvent, etc. may be dissolved or dispersed in the water according to such purposes as to impart a moisture-retaining property, impart an antibacterial activity, impart conductivity, adjust hardness, etc.

The content of the water is not particularly limited, and may be appropriately selected according to the purpose.

—Organic Solvent—

The organic solvent is preferably water-based, and examples thereof include alcohols such as ethanol, ethers, and ketones.

The organic solvent is not particularly limited, and an appropriate organic solvent may be selected according to the purpose. Examples thereof include 1,2,6-hexane triol, 1,2-butanediol, 1,2-hexanediol, 1,2-pentanediol, 1,3-dimethyl-2-imidazolidinone, 1,3-butanediol, 1,3-propane diol, 1,4-butanediol, 1,5-pentanediol, 1,6-hexanediol, 2,2-dimethyl-1,3-propane diol, 2,3-butanediol, 2,4-pentanediol, 2,5-hexanediol, 2-ethyl-1,3-hexanediol, 2-pyrrolidone, 2-methyl-1,3-propane diol, 2-methyl-2,4-pentanediol, 3-methyl-1,3-butanediol, 3-methyl-1,3-hexanediol, N-methyl-2-pyrrolidone, N-methyl pyrrolidinone, β-butoxy-N,N-dimethyl propion amide, β-methoxy-N,N-dimethyl propion amide, γ-butyrolactone, ε-caprolactam, ethylene glycol, ethylene glycol-n-butyl ether, ethylene glycol-n-propyl ether, ethylene glycol phenyl ether, ethylene glycol mono-2-ethyl hexyl ether, ethylene glycol monoethyl ether, glycerin, diethylene glycol, diethylene glycol-n-hexyl ether, diethylene glycol methyl ether, diethylene glycol monoethyl ether, diethylene glycol monobutyl ether, diethylene glycol monomethyl ether, diglycerin, dipropylene glycol, dipropylene glycol-n-propyl ether, dipropylene glycol monomethyl ether, dimethyl sulfoxide, sulfolane, thio diglycol, tetraethylene glycol, triethylene glycol, triethylene glycol ethyl ether, triethylene glycol dimethyl ether, triethylene glycol monobutyl ether, triethylene glycol methyl ether, tripropylene glycol, tripropylene glycol-n-propyl ether, tripropylene glycol methyl ether, trimethylol ethane, trimethylol propane, propyl propylene diglycol, propylene glycol(1,2-propane diol), propylene glycol-n-butyl ether, propylene glycol-t-butyl ether, propylene glycol phenyl ether, propylene glycol monoethyl ether, hexylene glycol, polyethylene glycol, and polypropylene glycol. One of these may be used alone, or two or more of these may be used in combination.

A content of the organic solvent is preferably from 1% by mass to 40% by mass, and more preferably from 5% by mass to 20% by mass relative to the whole amount of the three-dimensional object forming liquid.

—Layered Mineral—

The layered mineral is preferably a layered mineral dispersed in water in a state of single layers.

Here, the layered mineral is in a state that two-dimensional disk-shaped crystals including unit cells in the crystals are layered, as illustrated in FIG. 1A. When dispersed in water, the layered mineral separates into the state of individual single layers and becomes disk-shaped crystals, as illustrated in FIG. 1B.

The layered mineral is not particularly limited, and an appropriate layered mineral may be selected according to the purpose. Examples thereof include water-swellable layered clay minerals.

Examples of the water-swellable layered clay minerals include water-swellable smectite, and water-swellable mica. More specific examples include water-swellable hectorite, water-swellable montmorillonite, water-swellable saponite, and water-swellable synthetic mica that include sodium as interlayer ions.

Figure 1B:
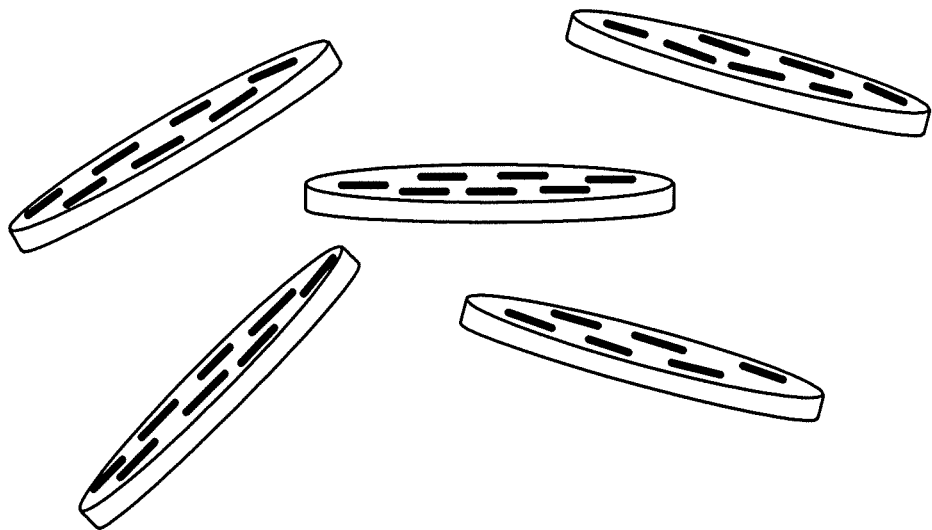
FIG. 1B is an exemplary diagram illustrating an example of a state of the layered mineral illustrated in FIG. 1A being dispersed in water.

The water swellability means a property that the layers of the layered mineral become dispersed in water by the water molecules being intercalated between the layers, as illustrated in FIG. 1B.

As the water-swellable layered clay mineral, one of those described above may be used alone, or two or more of those described above may be used in combination. The water-swellable layered clay mineral may be an appropriately synthesized product or may be a commercially available product.

Examples of commercially available products include a synthetic hectorite (LAPONITE XLG manufactured by Rock Wood Co., Ltd.), SWN (manufactured by Coop Chemical Ltd.), and a fluorinated hectorite SWF (manufactured by Coop Chemical Ltd.). Among these, the synthetic hectorite is preferable.

A content of the layered mineral is preferably from 1% by mass to 40% by mass, and more preferably from 1% by mass to 15% by mass relative to the whole amount of the three-dimensional object forming liquid. When the content is in the range of from 1% by mass to 40% by mass, the viscosity of the three-dimensional object forming liquid will be adequate, and jettability thereof by inkjet and the hardness of a three-dimensional object will be favorable.

—Monofunctional Monomer—

The monofunctional monomer is a compound having one unsaturated carbon-carbon bond. Examples thereof include acrylamide, N-substituted acrylamide derivatives, N,N-disubstituted acrylamide derivatives, N-substituted methacrylamide derivatives, N, N-disubstituted methacrylamide derivatives, and other monofunctional monomers. One of these may be used alone, or two or more of these may be used in combination.

The N-substituted acrylamide derivatives, the N,N-disubstituted acrylamide derivatives, the N-substituted methacrylamide derivatives, or the N,N-disubstituted methacrylamide derivatives are not particularly limited, and an appropriate example may be selected according to the purpose. Examples thereof include N,N-dimethyl acrylamide, and N-isopropyl acrylamide.

Examples of the other monofunctional monomers include 2-ethyl hexyl (meth)acrylate (EHA), 2-hydroxy ethyl (meth) acrylate (HEA), 2-hydroxy propyl (meth)acrylate (HPA), caprolactone-modified tetrahydro furfuryl (meth)acrylate, isobornyl (meth)acrylate, 3-methoxy butyl(meth)acrylate, tetrahydro furfuryl (meth)acrylate, lauryl (meth)acrylate, 2-phenoxy ethyl (meth)acrylate, isodecyl (meth)acrylate, isooctyl (meth)acrylate, tridecyl (meth)acrylate, caprolactone (meth)acrylate, ethoxylated nonyl phenol (meth)acrylate, and urethane (meth)acrylate. One of these may be used alone, or two or more of these may be used in combination.

When the monofunctional monomer is polymerized, a water-soluble organic polymer having an amide group, an amino group, a hydroxyl group, a tetramethyl ammonium group, a silanol group, an epoxy group, or the like is obtained.

A water-soluble organic polymer having an amide group, an amino group, a hydroxyl group, a tetramethyl ammonium group, a silanol group, an epoxy group, or the like is an advantageous constituent component for maintaining the strength of the hydrogel.

A content of the monofunctional monomer is not particularly limited, and may be appropriately selected according to the purpose. However, it is preferably from 1% by mass to 10% by mass, and more preferably from 1% by mass to 5% by mass relative to the whole amount of the three-dimensional object forming liquid. When the content is in the range of from 1% by mass to 10% by mass, there are advantages that dispersion stability of the layered mineral in the three-dimensional object forming liquid is maintained, and that stretchability of a three-dimensional object is improved. The stretchability means a property that a three-dimensional object does not tear when stretched.

—Polymerization Initiator—

Examples of the polymerization initiator include a thermal polymerization initiator, and a photopolymerization initiator.

—Thermal Polymerization Initiator—

The thermal polymerization initiator is not particularly limited, and an appropriate thermal polymerization initiator may be selected according to the purpose. Examples thereof include azo-initiators, peroxide initiators, persulfate initiators, and redox (oxidoreduction) initiators.

Examples of the azo-initiators include 2,2'-azobis(4-methoxy-2,4-dimethyl valeronitrile) (VAZO 33), 2,2'-azobis(2-amidino propane) dihydrochloride (VAZO 55), 2,2'-azobis(2,4-dimethyl valeronitrile) (VAZO 52), 2,2'-azobis (isobutyronitrile) (VAZO 64), 2,2'-azobis-2-methyl butyronitrile (VAZO 67), and 1,1-azobis(1-cyclohexane carbonitrile) (VAZO 88) (all available from DuPont Chemical Company), VA-044, VA-46B, V-50, VA-057, VA-061, VA-067, VA-086, 2,2'-azobis(2-cyclopropyl propionitrile), and 2,2'-azobis(methyl isobutyrate) (V-601) (all available from Wako Pure Chemical Industries, Ltd.).

Examples of the peroxide initiators include benzoyl peroxide, acetyl peroxide, lauroyl peroxide, decanoyl peroxide, dicetyl peroxy dicarbonate, di(4-t-butyl cyclohexyl)peroxy dicarbonate (PERKADOX 16S) (available from Akzo Nobel Inc.), di(2-ethyl hexyl)peroxy dicarbonate, t-butyl peroxy pivalate (LUPERSOL 11) (available from Elf Atochem Inc.), t-butyl peroxy-2-ethyl hexanote (TRIGONOX 21-C50) (available from Akzo Nobel Inc.), and dicumyl peroxide.

Examples of the persulfate initiators include potassium persulfate, sodium persulfate, and ammonium persulfate.

Examples of the redox (oxidoreduction) initiators include combinations of reductants such as sodium hydrogen meta sulfite and sodium hydrogen sulfite with the persulfate initiators, systems based on the organic peroxides and tertiary amines (e.g., a system based on benzoyl peroxide and dimethyl aniline), and systems based on organic hydro peroxides and transition metals (e.g., a system based on cumene hydro peroxide and cobalt naphthenate).

—Photopolymerization Initiator—

The photopolymerization initiator may be an arbitrary substance that produces radicals when irradiated with light (particularly, ultraviolet rays having a wavelength of from 220 nm to 400 nm).

Examples of the photopolymerization initiator include acetophenone, 2,2-diethoxy acetophenone, p-dimethyl amino acetophenone, benzophenone, 2-chlorobenzophenone, p,p'-dichlorobenzophenone, p,p-bis diethyl amino benzophenone, Michler ketone, benzyl, benzoin, benzoin methyl ether, benzoin ethyl ether, benzoin isopropyl ether, benzoin-n-propyl ether, benzoin isobutyl ether, benzoin-n-butyl ether, benzyl methyl ketal, thioxanthone, 2-chlorothioxanthone, 2-hydroxy-2-methyl-1-phenyl-1-one, 1-(4-isopropyl phenyl)2-hyroxy-2-methyl propan-1-one, methyl benzoyl formate, 1-hydroxy cyclohexyl phenyl ketone, azobis isobutylonitrile, benzoyl peroxide, and di-tert-butyl peroxide. One of these may be used alone, or two or more of these may be used alone.

A content of the polymerization initiator is not particularly limited, and may be appropriately selected according to the purpose. However, it is preferably from 0.01% by mass to 3% by mass relative to the whole monomer amount in the three-dimensional object forming liquid.

—Other Components—

The other components are not particularly limited, and appropriate components may be selected according to the purpose. Examples thereof include surfactants, colorants, stabilizing agents, water-soluble resins, low-boiling-point alcohols, surface treating agents, viscosity modifiers, tackifiers, antioxidants, anti-aging agents, cross-linking promoters, ultraviolet absorbers, plasticizers, antiseptics, and dispersants.

—Physical Properties of Three-Dimensional Object Forming Liquid—

A surface tension of the three-dimensional object forming liquid is not particularly limited, and may be appropriately selected according to the purpose. However, it is preferably from 20 mN/m to 45 mN/m, and more preferably from 25 mN/m to 34 mN/m.

When the surface tension is 20 mN/m or greater, jettability of the three-dimensional object forming liquid during three-dimensional object formation will be good. When the surface tension is 45 mN/m or less, a filling property of the three-dimensional object forming liquid when filled into jet nozzles, etc. will be good.

The surface tension can be measured with, for example, a surface tensiometer (an automatic contact angle gauge DM-701 manufactured by Kyowa Interface Science Co., Ltd.).

A viscosity of the three-dimensional object forming liquid is not particularly limited, and may be appropriately selected according to the purpose. However, it is preferably from 3 mPa·s to 20 mPa·s, and more preferably from 6 mPa·s to 12 mPa·s at 25° C.

When the viscosity is in the range of from 3 mPa·s to 20 mPa·s, jettability of the three-dimensional object forming liquid during three-dimensional object formation will be good.

The viscosity can be measured with, for example, a rotary viscometer (VISCOMATE VM-150III manufactured by Toki Sangyo Co., Ltd.) at 25° C.

An 80% strain compressive stress of a hydrogel that is obtained by curing the three-dimensional object forming liquid is preferably 0.4 MPa or greater. When the 80% strain compressive stress is 0.4 MPa or greater, there is an advantage that a hardness close to a living body texture can be reproduced, and a realistic organ model can be provided.

The 80% strain compressive stress can be measured with, for example, a universal tester (AG-I manufactured by Shimadzu Corporation).

The three-dimensional object forming liquid of the present invention can be used favorably for production of various three-dimensional objects, and can be used particularly favorably for a three-dimensional object forming liquid set of the present invention, a three-dimensional object producing method of the present invention, and a three-dimensional object of the present invention.

(Three-Dimensional Object Forming Liquid Set)

A three-dimensional object forming liquid set of the present invention includes a first liquid and a second liquid, preferably includes a third liquid and a fourth liquid, and further includes other components, etc. according to necessity.

<Second Liquid>

The second liquid includes a hydrogel precursor, and may be similar to the first liquid except that it is compositionally different from the first liquid.

Being compositionally different from the first liquid means that at least any of the kinds and the contents of the components constituting the second liquid is different from the first liquid.

It is preferable that the first liquid and the second liquid be cured to hydrogels that are different from each other in elastic modulus (80% strain compressive stress or compressive elastic modulus). This makes it possible to efficiently produce a three-dimensional object that includes in the single three-dimensional object, regions different in elastic modulus.

<Third Liquid>

The third liquid includes at least a polymerization initiator, preferably includes water and an organic solvent, and may further includes a multifunctional monomer, a monofunctional monomer, and other components according to necessity. Note that the third liquid is free of a layered mineral.

—Polymerization Initiator—

Examples of the polymerization initiator includes a thermal polymerization initiator and a photopolymerization initiator. Of these, a photopolymerization initiator is preferable in terms of storage stability.

The thermal polymerization initiator and the photopolymerization initiator may be the same as those presented above for the three-dimensional object forming liquid of the present invention.

Independent use of the photopolymerization initiator in the third liquid that is different from at least any one of the first liquid and the second liquid makes it possible to secure storage stability during storage of at least any one of the first liquid and the second liquid, and also to add the photopolymerization initiator in a greater amount than when it is assumed that the photopolymerization initiator is used in at least any one of the first liquid and the second liquid for the same sake of storage stability. This increases the rate of polymerization of a three-dimensional object, and enables efficient production thereof.

In terms of storage stability, it is preferable that the content of the photopolymerization initiator in the third liquid be greater than that in at least any one of the first liquid and the second liquid. It is more preferable that at least any one of the first liquid and the second liquid be free of a photopolymerization initiator.

The multifunctional monomer, the monofunctional monomer, and the other components may be the same as those of the first liquid. It is possible to appropriately select a more preferable monomer depending on the combination with the polymerization initiator.

—Viscosity Change Rate—

A viscosity change rate of the third liquid before and after it is left at 50° C. for two weeks is preferably 20% or less, and more preferably 10% or less.

When the viscosity change rate is 10% or less, the storage stability of the third liquid is adequate, and jetting stability of the third liquid when it is delivered by an inkjet method will be good.

The viscosity change rate before and after being left at 50° C. for two weeks can be measured as follows.

The third liquid is put in a polypropylene-made wide-mouthed bottle (50 mL), and left in a constant-temperature bath of 50° C. for two weeks. After this, the bottle is taken out from the constant-temperature bath, left until it becomes room temperature (25° C.), and the viscosity of the third liquid is measured. The viscosity change rate is calculated according to the formula below, where the viscosity of the third liquid before put in the constant-temperature bath is referred to as pre-storage viscosity, and the viscosity of the third liquid after taken out from the constant-temperature bath is referred to as post-storage viscosity. The pre-storage viscosity and the post-storage viscosity can be measured with TYPE R VISCOMETER (manufactured by Toki Sangyo Co., Ltd.) at 25° C.

$$\text{Viscosity change rate (\%)} = [(\text{post-storage viscosity}) - (\text{pre-storage viscosity})]/(\text{pre-storage viscosity}) \times 100$$

The pre-storage viscosity of the third liquid is preferably 20 mPa·s or less, more preferably from 3 mPa·s to 20 mPa·s, and yet more preferably from 3 mPa·s to 12 mPa·s at 25° C. When the viscosity is 20 mPa·s or less, jetting from inkjet nozzles will be stable.

The post-storage viscosity of the third liquid is preferably from 3 mPa·s to 12 mPa·s at 25° C.

<Fourth Liquid>

The fourth liquid is a liquid that is to become a hard formed body for supporting a three-dimensional object made of a hydrogel (a soft body) (the fourth liquid will also be referred to as "hard formed body material"). The fourth liquid includes a curable material, preferably includes a polymerization initiator, further includes other components according to necessity, but is free of water and a layered mineral.

—Curable Material—

The curable material is preferably a compound that induces polymerization reaction and cures upon irradiation of active energy rays (ultraviolet rays, electron beams, etc.), heating, etc. An appropriate curable material may be selected according to the purpose, and examples thereof include active energy ray-curable compounds, and thermosetting compounds. Among these, materials that are liquid at normal temperature are preferable.

The active energy ray-curable compounds are monomers having a radically-polymerizable unsaturated double bond in a molecular structure thereof and having a relatively low viscosity, and an appropriate active energy ray-curable compound may be used as selected from the multifunctional monomers and monofunctional monomers used in the first liquid and the second liquid. One of these may be used alone, or two or more of these may be used in combination.

The content of the curable material is not particularly limited, and may be appropriately selected according to the purpose.

—Other Components—

The other components are not particularly limited, and appropriate components may be selected according to the purpose. Examples thereof include colorants, water-soluble resins, low-boiling-point alcohols, surfactants, viscosity modifiers, tackifiers, antioxidants, anti-aging agents, cross-linking promoters, ultraviolet absorbers, plasticizers, antiseptics, and dispersants.

The surface tension of the fourth liquid is not particularly limited, and may be appropriately selected according to the purpose. However, it is preferably from 20 mN/m to 45 mN/m, and more preferably from 25 mN/m to 34 mN/m.

When the surface tension is 20 mN/m or greater, jettability during three-dimensional object formation will be good. When the surface tension is 45 mN/m or less, a filling property of the fourth liquid when filled into jetting nozzles for three-dimensional object formation will be good.

The surface tension can be measured with, for example, a surface tensiometer (an automatic contact angle gauge DM-701 manufactured by Kyowa Interface Science Co., Ltd.).

The viscosity of the fourth liquid is not particularly limited, may be appropriately selected according to the purpose, and can be appropriately adjusted based on temperature adjustment. However, it is preferably from 3 mPa·s to 20 mPa·s, and more preferably from 6 mPa·s to 12 mPa·s at 25° C.

In the viscosity range of from 3 mPa·s to 20 mPa·s, jettability of the fourth liquid during three-dimensional object formation will be good.

The viscosity can be measured with, for example a rotary viscometer (VISCOMATE VM-150III manufactured by Sangyo Co., Ltd.) at 25° C.

The three-dimensional object forming liquid set of the present invention can be used favorably for production of various three-dimensional objects, can be used favorably for production of a complicated fine three-dimensional object including in the single three-dimensional object, regions different in elastic modulus, represented by an organ model, etc., and can be used particularly favorably for a three-dimensional object producing method of the present invention and a three-dimensional object of the present invention, which are to be described below.

(Three-Dimensional Object Producing Method)
<First Mode>

A three-dimensional object producing method according to a first mode of the present invention includes a first step and a second step, preferably includes a fifth step and an eighth step, and further includes other steps according to necessity.

—First Step—

The first step is a step of forming a film by delivering a first liquid as a hydrogel precursor including at least a multifunctional monomer.

The first liquid may be the same as the three-dimensional object forming liquid of the present invention.

A method for delivering the first liquid is not particularly limited, and an appropriate method may be selected according to the purpose as long as the method can apply liquid droplets made of the first liquid to an intended position with an appropriate precision. Examples thereof include a dispenser method, a spray method, and an inkjet method. Known apparatuses can be used favorably for carrying out these methods.

Among these, the inkjet method is particularly preferable in the present invention. The inkjet method is advantageous over the spray method in better liquid droplet quntitativity, advantageous over the dispenser method in broader coating area, and is preferable because it is capable of forming a complicated three-dimensional shape precisely and efficiently.

—Second Step—

The second step is a step of curing the film formed in the first step.

Examples of a unit configured to cure the film include ultraviolet (UV)-emitting lamps, electron beam-emitting devices, and heating devices. It is preferable that the unit configured to cure the film include an ozone removal system.

The kinds of the ultraviolet (UV)-emitting lamps include high-pressure mercury lamps, ultrahigh pressure mercury lamps, and metal halides.

Although the ultrahigh pressure mercury lamps are point light sources, Deep UV mercury lamps combined with an optical system and enhanced in light use efficiency can emit a short-wavelength range.

The metal halides are effective for colored materials because they have a broad wavelength range, and use halides of metals such as Pb, Sn, Fe, etc., from which an appropriate one can be selected according to the absorption spectrum of the photopolymerization initiator. For example, commercially available products such as H LAMP, D LAMP, and V LAMP manufactured by Fusion System may be used.

Heating methods by the heating devices include a method of heating a formed film by bringing it into contact with a heat source, and a method of heating a formed film without bringing it into contact with a heat source, such as a method of irradiating a formed with far infrared rays, near infrared rays, microwaves, or the like, and a method of blowing a formed film with hot air.

The heating may be performed alone, but may also be performed before ultraviolet irradiation, simultaneously with ultraviolet irradiation, or after ultraviolet irradiation.

The cured film is in the form of including water and components dissolved in water in a three-dimensional network structure formed by a water-soluble organic polymer produced from polymerization of the monofunctional monomer and the multifunctional monomer being combined with the layered mineral.

—Fifth Step—

The fifth step is a step of delivering a third liquid including at least a polymerization initiator to the same position as where the first liquid is delivered.

It is preferable that the fifth step be performed between the first step and the second step.

The third liquid includes a polymerization initiator, and may be similar to the first liquid except that it is compositionally different from the first liquid. Being compositionally different from the first liquid means that at least any of the kinds and the contents of the components constituting the first liquid is different from the third liquid.

Delivering the third liquid to the same position as where the first liquid is delivered means delivering the third liquid over the first liquid delivered previously in an overlapping manner. The third liquid is compatible with the first liquid. Therefore, by delivering the third liquid to the same position as where the first liquid is delivered, it is possible to make the polymerization initiator included in the third liquid serve as a polymerization initiator for the monomers included in the first liquid.

The third liquid may be the same as the third liquid included in the three-dimensional object forming liquid set of the present invention.

A method for delivering the third liquid is not particularly limited, and an appropriate method may be selected according to the purpose as long as it is a method capable of applying liquid droplets made of the third liquid to an intended position with an appropriate precision. Examples thereof include a dispenser method, a spray method, and an inkjet method.

—Eighth Step—

The eighth step is a step of forming a film by delivering a fourth liquid that is to become a hard formed body for supporting a three-dimensional object made of the hydrogel to a different position from where the first liquid is delivered.

The fourth liquid may be the same as the fourth liquid included in the three-dimensional object forming liquid set of the present invention.

Delivering the fourth liquid to a different position from where the first liquid is delivered means that the positions to where the fourth liquid and the first liquid are delivered do not overlap each other. Hence, the fourth liquid and the first liquid may adjoin each other. The fourth liquid is compositionally different from the first liquid, and not easily miscible with the first liquid. Therefore, even when the fourth liquid and the first liquid adjoin each other, the boundary between them after cured will be clear.

A method for delivering the fourth liquid is not particularly limited, and an appropriate method may be selected according to the purpose as long as it is a method capable of applying liquid droplets made of the fourth liquid to an intended position with an appropriate precision. Examples thereof include a dispenser method, a spray method, and an inkjet method.

—Other Steps—

The other steps are not particularly limited, and appropriate steps may be selected according to the purpose. Examples thereof include a data processing step of acquiring and processing three-dimensional data, a detaching step of detaching a hydrogel from its support member (a hard formed body), a washing step of washing a three-dimensional object, and a polishing step of polishing a three-dimensional object.

The three-dimensional object producing method according to the first mode repeats the respective steps a plurality of times. The number of times of repetition cannot be determined flatly because it varies depending on the size, shape, structure, etc. of a three-dimensional object to be produced. As long as the thickness per layer is in the range of from 10 µm to 50 µm, an object can be formed with a good precision and without detachment. Hence, it is necessary to stack layers repeatedly up until the height of the three-dimensional object to be produced.

<Second Mode>

A three-dimensional object producing method according to a second mode of the present invention includes a first step, a third step, and a fourth step, preferably includes a sixth step and a seventh step, and further includes other steps according to necessity.

—Third Step—

The third step is a step of forming a film by delivering a second liquid including a hydrogel precursor and compositionally different from the first liquid to a different position from where the first liquid is delivered.

Delivering the second liquid to a different position from where the first liquid is delivered means that the positions to where the first liquid and the second liquid are delivered do not overlap each other. Hence, the first liquid and the second liquid may adjoin each other. The second liquid is compositionally different from the first liquid but compatible with the first liquid. Therefore, the second liquid and the first liquid become compatibilized with each other at an adjoining region where they adjoin each other, and when cured, can form one hydrogel in which they are different in elastic modulus.

The first liquid and the second liquid may be the same as the first liquid and the second liquid included in the three-dimensional object forming liquid set of the present invention.

A method for delivering the second liquid is not particularly limited, and an appropriate method may be selected according to the purpose as long as it is a method capable of applying liquid droplets made of the second liquid to an intended position with an appropriate precision. Examples thereof include a dispenser method, a spray method, and an inkjet method.

—Fourth Step—

The fourth step is a step of curing the films formed in the first step and the third step respectively.

The film formed in the first step and the film formed in the third step may be cured simultaneously or separately. However, simultaneous curing is preferable in terms of productivity.

A unit configured to cure the films is not particularly limited, and an appropriate unit may be selected according to the purpose. For example, it may be the same as that in the second step of the three-dimensional object producing method according to the first mode.

—Sixth Step—

The sixth step is a step of delivering a third liquid including at least a polymerization initiator to the same position as at least any one of where the first liquid is delivered and where the second liquid is delivered.

It is preferable that the sixth step be performed between the first step and the third step, or between the third step and the fourth step.

The third liquid includes a polymerization initiator, and may be similar to the first liquid and the second liquid except that it is compositionally different from the first liquid and the second liquid. Being compositionally different from the first liquid and the second liquid means that at least any of the kinds and the contents of the components constituting the first liquid and the second liquid is different from the third liquid.

Delivering the third liquid to the same position as at least any one of where the first liquid is delivered and where the second liquid is delivered means delivering the third liquid over at least any one of the first liquid and the second liquid delivered previously in an overlapping manner. The third liquid is compatible with the first liquid and the second liquid. Therefore, by delivering the third liquid to the same position as at least any one of where the first liquid is delivered and where the second liquid is delivered, it is possible to make the polymerization initiator included in the third liquid serve as a polymerization initiator for the monomers included in the first liquid and the second liquid.

The third liquid may be the same as the third liquid included in the three-dimensional object forming liquid set of the present invention.

A method for delivering the third liquid is not particularly limited, and an appropriate method may be selected according to the purpose as long as it is a method capable of applying liquid droplets made of the third liquid to an intended position with an appropriate precision. Examples thereof include a dispenser method, a spray method, and an inkjet method.

—Seventh Step—

The seventh step is a step of forming a film by delivering a fourth liquid that is to become a hard formed body for supporting a three-dimensional object made of the hydrogel to a different position from at least any one of where the first liquid is delivered and where the second liquid is delivered.

The fourth liquid may be the same as the fourth liquid included in the three-dimensional object forming liquid set of the present invention.

Delivering the fourth liquid to a different position from at least any one of where the first liquid is delivered and where the second liquid is delivered means that the positions to where the fourth liquid, and the first liquid and the second liquid are delivered do not overlap with each other. Hence, the fourth liquid, and the first liquid and the second liquid may adjoin each other. The fourth liquid is compositionally different from the first liquid and the second liquid and not easily miscible with them. Therefore, even when the fourth liquid and the first liquid or the second liquid adjoin each other, the boundary between them after cured will be clear.

A method for delivering the fourth liquid is not particularly limited, and an appropriate method may be selected according to the purpose as long as it is a method capable of applying liquid droplets made of the fourth liquid to an intended position with an appropriate precision. Examples thereof include a dispenser method, a spray method, and an inkjet method.

—Other Steps—

The other steps are not particularly limited, and appropriate steps may be selected according to the purpose. Examples thereof include a data processing step of acquiring and processing three-dimensional data, a detaching step of detaching a hydrogel from its support member (a hard formed body), a washing step of washing a three-dimensional object, and a polishing step of polishing a three-dimensional object.

The three-dimensional object producing method according to the second mode repeats the respective steps a plurality of times. The number of times of repetition cannot be determined flatly because it varies depending on the size, shape, structure, etc. of a three-dimensional object to be produced. As long as the thickness per layer is in the range of from 10 μm to 50 μm, an object can be formed with a good precision and without detachment. Hence, it is necessary to stack layers repeatedly up until the height of the three-dimensional object to be produced.

The data processing step may be performed with reference to the description in JP-B No. 5239037. In the present invention, the process from data acquisition until jetting of the respective liquids using the three-dimensional object forming liquid set is performed as below.

First, surface data or solid data of a three-dimensional shape designed with a three-dimensional CAD or a three-dimensional shape acquired with a three-dimensional scanner or a digitizer is converted to an STL format, and various data obtained as a result are input to a three-dimensional object forming apparatus. Based on the various data that are input, the three-dimensional object forming apparatus determines a forming direction of a three-dimensional shape to be formed. The forming direction is not particularly limited, and it is typically preferable to select a direction in which the shortest dimension of the three-dimensional object is aligned in a Z-direction (i.e., a height direction).

After determining the forming direction, the three-dimensional object forming apparatus calculates projected areas of the three-dimensional shape on an X-Y plane, an X-Z plane, and a Y-Z plane. In order to reinforce the obtained block shape, the three-dimensional object forming apparatus moves each surface thereof except the top surface in the X-Y plane outward by an appropriate amount. The amount of move is not particularly limited and varies depending on shape, size, and materials used, but is from about 1 mm to 10 mm. In this way, the three-dimensional object forming apparatus specifies a block shape that encloses therein the shape to be formed (but is opened at the top surface).

The three-dimensional object forming apparatus cuts (slices) the block shape into round slices at one-layer-thickness intervals in the Z-direction. The thickness of one layer varies depending on the materials used and cannot be determined flatly, but is preferably from 10 μm to 50 μm. When there is one three-dimensional object to be formed, the block shape is positioned in the center of a Z-stage (i.e., a table over which an object being formed is mounted, and is configured to lift down each time one layer is formed by an amount corresponding to one layer). When a plurality of three-dimensional objects are to be formed simultaneously, the block shapes are positioned over the Z-stage, but may also be stacked one upon another. The three-dimensional object forming apparatus may perform such block shaping, slice data (contour data) generation, and Z-stage positioning automatically upon designation of the materials used.

Next, based on the outermost contour line among the slice data, the three-dimensional object forming apparatus controls the position from which to jet each liquid by an inkjet method by performing in/out determination (i.e., determination of whether or not to jet each liquid of the three-dimensional object forming liquid set to a position on the contour line).

The order of jetting each liquid of the three-dimensional object forming liquid set in the case where, for example, the first liquid, the second liquid, and the fourth liquid are used is preferably the fourth liquid for forming a support member first, and then at least any one of the first liquid and the second liquid for forming a three-dimensional object (a hydrogel) next. In such a jetting order, a pooling portion such as a groove, a dam, etc. is formed by the support member first, and at least any one of the first liquid and the second liquid is to be jetted into the pooling portion. This eliminates the risk of "dripping-off" of materials that are liquid at normal temperature and used as the first liquid and the second liquid, which allows use of a wide variety of photo-curable resins, thermosetting resins, etc. When the third liquid is also used, the jetting order is the same, except that after at least any one of the first liquid and the second liquid is jetted, the third liquid is jetted to the same position as at least any one of the position to which the first liquid is jetted and the position to which the second liquid is jetted.

In order to shorten the time taken for the formation, preferable is a method of jetting at least any one of the first liquid, the second liquid, and the fourth liquid on each of the outward path and homeward path of an integrated inkjet head and stacking layers thereby. Furthermore, by providing an active energy ray-emitting device (e.g., an ultraviolet ray-emitting device) or an infrared ray-emitting device in the proximity of the inkjet head, it is possible to save the time taken for a smoothing process, and realize a high-speed object formation.

As described above, in the three-dimensional object producing method of the present invention, the liquids are jetted from minute pores by an inkjet method, a dispenser method, etc., which realizes a clear separation and an immiscible incompatible state at where at least any one of the first liquid and the second liquid applied in a manner capable of forming an image on a layer-by-layer basis and yet to be cured contacts the fourth liquid.

In a conventional object forming method, at least any one of the first liquid and the second liquid, and the fourth liquid become compatibilized with each other at where they contact, and make their boundary when photo-cured unclear. As a result, minute irregularity remains in the surface of the three-dimensional object. However, in the three-dimensional object producing method of the present invention, at least any one of the first liquid and the second liquid, and the fourth liquid remain incompatible with each other at where they contact, and make their boundary after photo-cured clear. Furthermore, difference in hardness between the obtained three-dimensional object and the support member improves the detachability. This provides a better smoothness over the surface of the three-dimensional object, and makes it possible to skip or greatly reduce a polishing step after the object formation.

<Three-Dimensional Object Forming Apparatus>

Figure 2:
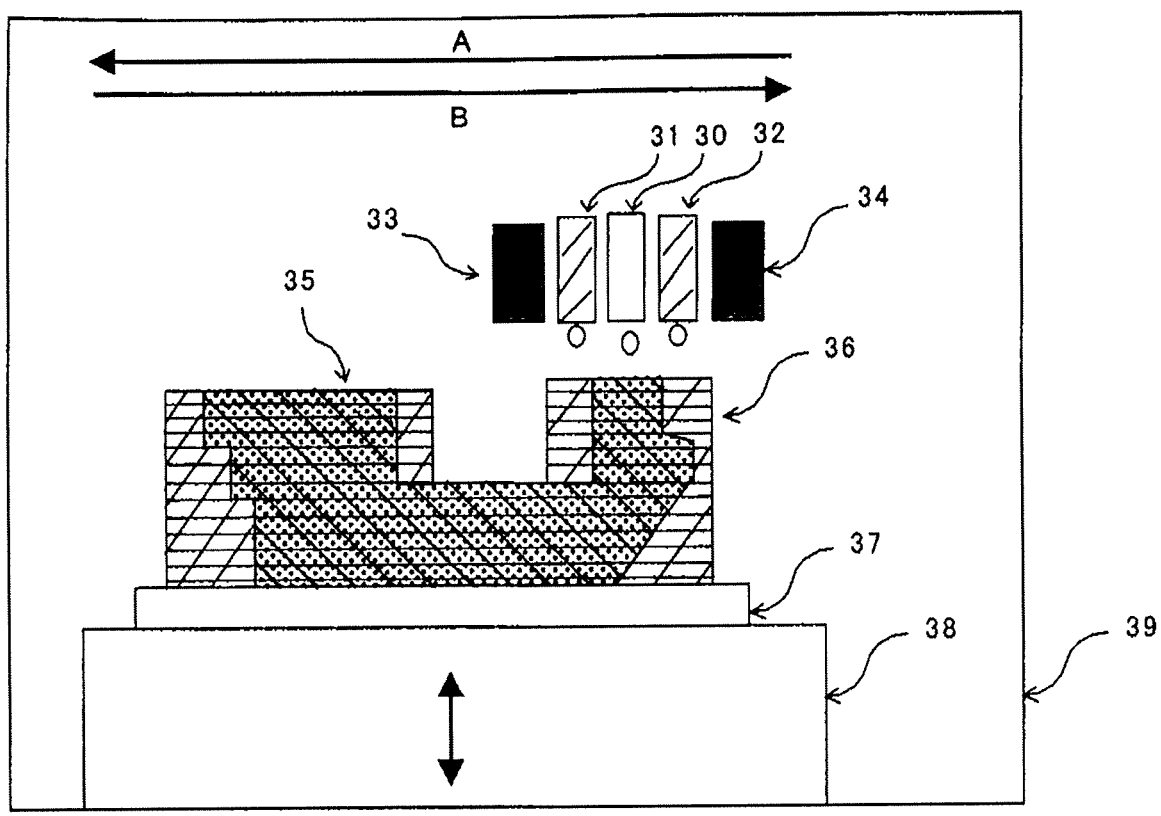
FIG. 2 is a schematic diagram illustrating an example of a three-dimensional object forming apparatus used in a three-dimensional object producing method of the present invention.

FIG. 2 is a schematic diagram illustrating one example of a three-dimensional object forming apparatus used in the present invention.

The three-dimensional object forming apparatus of FIG. 2 uses a head unit in which inkjet heads are arranged, and is configured to jet at least any one of the first liquid and the second liquid from an object-jetting head unit 30, and the third liquid from support member-jetting head units 31 and 32, cure each liquid of the three-dimensional object forming liquid set with adjoining ultraviolet ray-emitting devices or infrared ray-emitting devices 33 and 34, and stack layers thereby.

In FIG. 2, there is only one object-jetting head unit 30. However, two or more of the object-jetting head unit 30 may be provided. Further, it is possible to additionally provide infrared ray-emitting devices (unillustrated) at the positions adjoining the ultraviolet ray-emitting devices 33 and 34, and stack layers while heating and curing each liquid of the three-dimensional object forming liquid set.

A three-dimensional object 35 is produced in a manner that the fourth liquid is jetted from the support member-jetting head units 31 and 32 and solidified to form a first support member layer including a pooling portion, at least any one of the first liquid and the second liquid is jetted into the pooling portion of the first support member layer from the object-jetting head unit 30, active energy rays are emitted to irradiate at least any one of the first liquid and the second liquid and form a first object layer, the fourth liquid is jetted over the first support member layer and solidified to stack a second support member layer including a pooling portion, at least any one of the first liquid and the second liquid is jetted into the pooling portion of the second support member layer, and active energy rays are emitted to irradiate at least any one of the first liquid and the second liquid and stack a second object layer over the first object layer.

When the multi-head unit moves in the direction of the arrow A, the support member-jetting head unit 31, the object-jetting head unit 30, and the ultraviolet ray-emitting device or infrared ray-emitting device 34 are basically used to form a support member 36 and the three-dimensional object 35 over an object support substrate 37. Note that the support member-jetting head unit 32 and the ultraviolet ray-emitting device or infrared ray-emitting device 33 may be used supplementarily.

When the multi-head unit moves in the direction of the arrow B, the support member-jetting head unit 32, the object-jetting head unit 30, and the ultraviolet ray-emitting device or infrared ray-emitting device 33 are basically used to form the support member 36 and the three-dimensional object 35 over the object support substrate 37. Note that the support member-jetting head unit 31 and the ultraviolet ray-emitting device or infrared ray-emitting device 34 may be used supplementarily.

Layers are stacked while a stage 38 is lifted down according to the number of layers stacked, in order for the object-jetting head unit 30, the support member-jetting head units 31 and 32, and the ultraviolet ray-emitting devices or infrared ray-emitting devices 33 and 34 to be maintained at a constant gap from the three-dimensional object 35 and the support member 36.

Figure 3:
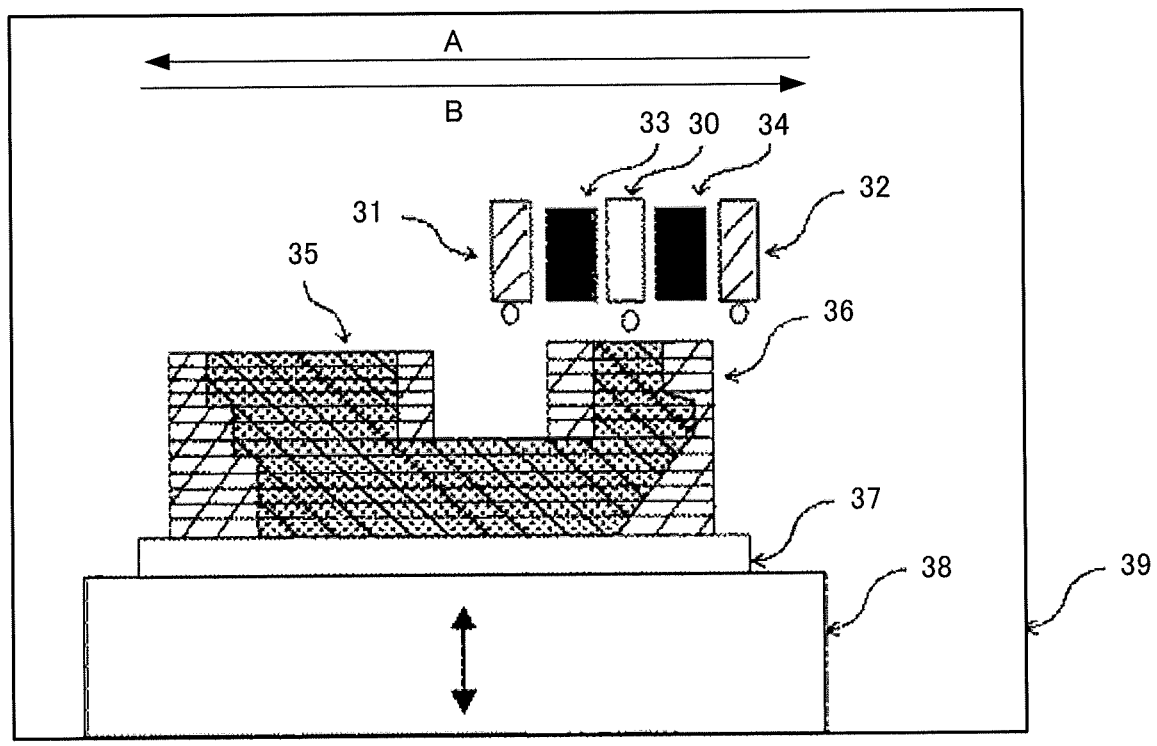
FIG. 3 is a schematic diagram illustrating another example of a three-dimensional object forming apparatus used in a three-dimensional object producing method of the present invention.

FIG. 3 is a schematic diagram illustrating another example of object producing steps that can provide a better smoothness to each layer than by the object producing steps of FIG. 2. Basic steps are identical with FIG. 2, but the difference is that the ultraviolet ray-emitting devices or infrared ray-emitting devices 33 and 34 are arranged between the object-jetting head unit 30, and the support member-jetting head units 31 and 32.

Further, in the three-dimensional object forming apparatus 39, the ultraviolet ray-emitting devices or infrared ray-emitting devices 33 and 34 are used in both moving directions of the arrows A and B, and the surface of at least any one of the first liquid and the second liquid that is/are stacked is smoothed by the heat generated along with their ultraviolet irradiation or infrared irradiation, which improves dimensional stability of the three-dimensional object.

The three-dimensional object forming apparatus 39 may be provided with an ink collecting system, a recycling system, etc. It may also be provided with blades for removing each liquid of the three-dimensional object forming liquid set that has adhered to a nozzle surface, and a detecting system for detecting nozzles that do not jet. Furthermore, it is also preferable that the ambient temperature inside the apparatus during formation be controlled.

(Three-Dimensional Object)

A three-dimensional object of the present invention is made of a hydrogel produced by curing the three-dimensional object forming liquid of the present invention, and preferably includes at least a first region made of a first hydrogel and a second region made of a second hydrogel different from the first hydrogen in elastic modulus (80% strain compressive stress or compressive elastic modulus). Although depending on the purpose of use, it is preferable that the 80% strain compressive stress of any one of the first hydrogel and the second hydrogel be 0.4 MPa or greater, or that the compressive elastic modulus thereof be 0.3 MPa or greater. Hence, there is obtained a three-dimensional object (hydrogel) that includes in the single three-dimensional object, regions different in elastic modulus.

The 80% strain compressive stress can be measured with, for example, a universal tester (AG-I manufactured by Shimadzu Corporation). The compressive elastic modulus can be obtained by calculating a difference between a 10% strain compressive stress and a 20% strain compressive stress, as a slope at a displacement of 10%.

It is preferable that a hydrogel produced from the hydrogel precursor be a hydrogel including water in a three-dimensional network structure formed by a water-soluble organic polymer produced from polymerization of at least a multifunctional monomer being combined with dispersed single layers of a layered mineral.

Examples of the water-soluble organic polymer include organic polymers having an amide group, an amino group, a hydroxyl group, a tetramethyl ammonium group, a silanol group, an epoxy group, etc.

The water-soluble organic polymer is a constituent component advantageous for maintaining the strength of a water-based gel.

The organic polymer may be a homopolymer or a heteropolymer (a copolymer), may be modified, may have a known functional group incorporated, or may be in the form of a salt, but is preferably a homopolymer.

In the present invention, "water-soluble" of the water-soluble polymer means a property that, for example, when the water-soluble polymer (1 g) is mixed in water (100 g) having a temperature of 30° C. and stirred, 90% by mass or greater thereof dissolves.

Figure 4A:
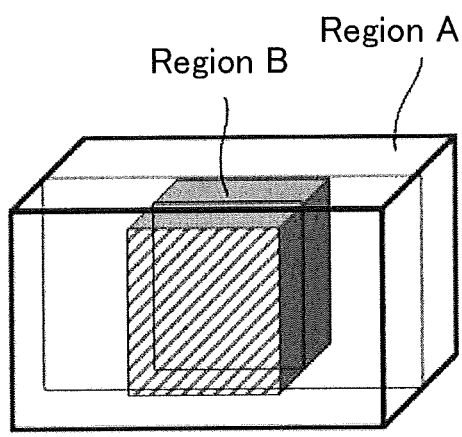
FIG. 4A is a schematic perspective diagram illustrating an example of a three-dimensional object produced by a three-dimensional object producing method of the present invention.
Figure 4B:
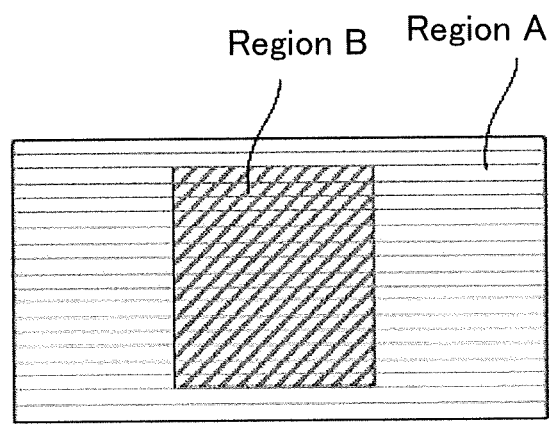
FIG. 4B is a schematic cross-sectional diagram of FIG. 4A.

As illustrated in FIG. 4A and FIG. 4B, in the three-dimensional object of the present invention, it is preferable that the first region (a region A) enclose the second region (a region B) therein completely.

The three-dimensional object is used favorably as an organ model, etc., because it can include in the single three-dimensional object, regions different in elastic modulus. The organ model is particularly favorable as an organ model for medical procedure trainings, because the organ model can faithfully reproduce internal structures such as blood vessels and areas of pathology that are different in hardness and elastic modulus, can feel very similar to the desired organ when touched or cut, and can be incised with a surgical scalpel.

EXAMPLES

Examples of the present invention will be described below. The present invention is not limited to these Examples.

(Production Example 1 of Fourth Liquid (Hard Formed Body Liquid))
—Production of Hard Formed Body Liquid 1—

A total of 300 g, which included urethane acrylate as a curable material (product name: DIABEAM UK6038 manufactured by Mitsubishi Rayon Co., Ltd.) (10 parts by mass), neopentyl glycol hydroxy pivalic acid ester dimethacrylate as a curable material (produce name: KAYARAD MANDA manufactured by Nippon Kayaku Co., Ltd.) (90 parts by mass), a photopolymerization initiator (product name: IRGACURE 184 manufactured by BASF GmbH) (3 parts by mass), and a blue pigment as a colorant (product name: LIONOL BLUE 7400G manufactured by Toyo Ink Co., Ltd.) (2 parts by mass), was dispersed with a homogenizer (HG30 manufactured by Hitachi Koki Co., Ltd.) at a rotation speed of 2,000 rpm until a uniform mixture was obtained. Then, the resultant was filtered to remove impurities, etc., and finally subjected to vacuum deaeration for 10 minutes, to thereby obtain a hard formed body liquid 1.

The surface tension and viscosity of the obtained hard formed body liquid 1 were measured in the manners described below. As a result, the surface tension was 27.1 mN/m, and the viscosity was 10.1 mPa·s at 25° C.

<Surface Tension Measurement>

The surface tension of the obtained hard formed body liquid 1 was measured with a surface tensiometer (an automatic contact angle gauge DM-701 manufactured by Kyowa Interface Science Co., Ltd.) according to a hanging drop method.

<Viscosity Measurement>

The viscosity of the obtained hard formed body liquid 1 was measured with a rotary viscometer (VISCOMATE VM-150III manufactured by Toki Sangyo Co., Ltd.) at 25° C.

Example 1

<Production of Three-Dimensional Object Forming Liquid 1 (First Liquid or Second Liquid)>

A three-dimensional object forming liquid 1 was produced in the manner described below based on the composition presented in Table 1.

—Preparation of Water—

Ion-exchanged water deaerated at reduced pressure for 10 minutes was used as pure water.

—Preparation of Initiator Liquids—

As a photopolymerization initiator liquid, a photopolymerization initiator (IRGACURE 184 manufactured by BASF GmbH) (2 parts by mass) was dissolved in ethanol (98 parts by mass), and prepared as an aqueous solution.

As a thermal polymerization initiator liquid 1, sodium peroxo disulfate (manufactured by Wako Pure Chemical Industries, Ltd.) (2 parts by mass) was dissolved in pure water (98 parts by mass), and prepared as an aqueous solution.

As a thermal polymerization initiator liquid 2, VA-067 (manufactured by Wako Pure Chemical Industries, Ltd.) (2 parts by mass) was dissolved in pure water (98 parts by mass), and prepared as an aqueous solution.

—Preparation of Three-Dimensional Object Forming Liquid 1—

First, while the pure water (195 parts by mass) was stirred, a synthetic hectorite (LAPONITE XLG manufactured by Rock Wood Co., Ltd.) having a composition of $[Mg_{5.34}Li_{0.66}Si_8O_{20}(OH)_4]Na^-_{0.66}$ as a layered mineral (8 parts by mass) was added thereto little by little, and they were stirred and prepared as a dispersion liquid.

Next, N,N-dimethyl acrylamide (DMAA manufactured by Wako Pure Chemical Industries, Ltd.) as a monofunctional monomer (20 parts by mass) which had been passed through an active alumina column to remove a polymerization inhibitor, and methylene bis acrylamide (MBAA manufactured by Wako Pure Chemical Industries, Ltd.) as a multifunctional monomer (0.3 parts by mass) were added to the obtained dispersion liquid. Further, sodium dodecyl sulfate (manufactured by Wako Pure Chemical Industries, Ltd.) as a surfactant (2 parts by mass) was added thereto and mixed.

Next, while the resultant was cooled in an ice bath, the photopolymerization initiator liquid (0.5 parts by mass), and the thermal polymerization initiator liquid 1 (5 parts by mass) were added thereto. After they were stirred and mixed, the resultant was deaerated at reduced pressure for 10 minutes. Then, the resultant was filtered to remove impurities, etc., to thereby prepare a three-dimensional object forming liquid 1.

The surface tension of the obtained three-dimensional object forming liquid 1 measured in the same manner as for the hard formed body liquid 1 was 31.3 mN/m, and the viscosity thereof measured in the same manner as for the hard formed body liquid 1 was 9.8 mPa·s at 25° C. These results are presented in Table 1.

<Production of Hydrogel>

Next, the three-dimensional object forming liquid 1 was poured into a mold, which was then capped with quartz glass to be airtightly closed. This was irradiated with a light volume of 350 mJ/cm² by an ultraviolet ray-emitting device (SPOT CURE SP5-250DB manufactured by Ushio Inc.), to thereby produce a hydrogel 1 having a cubic shape having a size of 10 mm×10 mm×10 mm.

A compression test of the obtained hydrogel 1 was performed in the manner described below. The result is presented in Table 1.

<Compression Test>

A load cell of 1 kN and a compression jig for 1 kN were set on a universal tester (AG-I manufactured by Shimadzu Corporation), and the hydrogel 1 having the shape of 10 mm×10 mm×10 mm was placed thereon. A stress corresponding to a compression imposed on the load cell was recorded on a computer, and a stress corresponding to an amount of displacement was plotted.

When the hydrogel was broken, the compressive stress when it was broken was obtained as a maximum value. When the hydrogel was not broken, the measurement was obtained as an 80% strain compressive stress.

The compressive elastic modulus of the hydrogel was obtained from the measurement data acquired by the same universal tester. The compressive elastic modulus was obtained by calculating a difference between a 10% strain compressive stress and a 20% strain compressive stress, as a slope at a displacement of 10%.

Examples 2 to 8 and Comparative Example 1

<Production of Three-Dimensional Object Forming Liquids 2 to 9>

Three-dimensional object forming liquids 2 to 9 were prepared in the same manner as in Example 1, except that the composition and contents were changed from Example 1 to those presented in Table 1 to Table 3 below.

The surface tension and viscosity of the obtained three-dimensional object forming liquids 2 to 9 were measured in the same manners as in Example 1. The results are presented in Table 1 to Table 3.

Next, hydrogels 2 to 7 and 9 were produced using the obtained three-dimensional object forming liquids 2 to 7 and 9 in the same manner as the production of the hydrogel 1. Further, a hydrogel 8 was produced using the three-dimensional object forming liquid 8, and with an infrared ray-emitting device instead of the ultraviolet ray-emitting device used in the production of the hydrogel 1.

The compression test of the obtained hydrogels 2 to 9 was performed in the same manner as for the hydrogel 1. The results are presented in Table 1 to Table 3.

TABLE 1

| Component (part by mass) | | Ex. 1 | Ex. 2 | Ex. 3 | Ex. 4 |
|---|---|---|---|---|---|
| Three-dimensional object forming liquid No. | | 1 | 2 | 3 | 4 |
| Hydrogel No. | | 1 | 2 | 3 | 4 |
| Layered mineral | XLG | 8 | 8 | 8 | 16 |
| Monofunctional monomer 1 | DMAA | 20 | 20 | — | 20 |
| Monofunctional monomer 2 | IPAM | — | — | 20 | — |
| Multifunctional monomer | MBAA | 0.3 | 0.15 | 0.3 | 0.3 |
| Surfactant | Na dodecyl sulfate | 2 | 2 | 2 | 2 |
| Photopolymerization initiator liquid | IRGACURE 184 | 0.5 | 0.5 | 0.5 | 0.5 |
| Thermal polymerization initiator liquid 1 | Na peroxo disulfate | 5 | 5 | 5 | 5 |
| Thermal polymerization initiator liquid 2 | VA-067 | — | — | — | — |
| water | Pure water | 195 | 195 | 195 | 189 |
| Properties of three-dimensional object forming liquid | Viscosity (mPa · s) | 9.8 | 9.8 | 10.0 | 18.8 |
| | Surface tension (mN/m) | 31.1 | 31.2 | 31.1 | 31.1 |
| Properties of hydrogel | Compressive elastic modulus (MPa) | 0.20 | 0.12 | 0.1 | 0.4 |
| | 80% strain compressive stress (MPa) | 3.2 | 1.8 | 1.2 | 6.0 |

TABLE 2

| Component (part by mass) | | Ex. 5 | Ex. 6 | Ex. 7 | Ex. 8 |
|---|---|---|---|---|---|
| Three-dimensional object forming liquid No. | | 5 | 6 | 7 | 8 |
| Hydrogel No. | | 5 | 6 | 7 | 8 |
| Layered mineral | XLG | 5 | 25 | 40 | 16 |
| Monofunctional monomer 1 | DMAA | 20 | 20 | 20 | 20 |
| Monofunctional monomer 2 | IPAM | — | — | — | — |
| Multifunctional monomer | MBAA | 0.6 | 0.3 | 0.3 | 0.3 |
| Surfactant | Na dodecyl sulfate | 2 | 2 | 2 | 2 |
| Photopolymerization initiator liquid | IRGACURE 184 | 0.5 | 0.5 | 0.5 | — |
| Thermal polymerization initiator liquid 1 | Na peroxo disulfate | 5 | 5 | 5 | — |
| Thermal polymerization initiator liquid 2 | VA-067 | — | — | — | 10 |
| water | Pure water | 195 | 195 | 195 | 195 |

TABLE 2-continued

| | | Ex. | | | |
|---|---|---|---|---|---|
| Component (part by mass) | | 5 | 6 | 7 | 8 |
| Properties of three-dimensional object forming liquid | Viscosity (mPa · s) | 4.5 | 38 | 60 | 19 |
| | Surface tension (mN/m) | 31.2 | 31.1 | 30.1 | 31.1 |
| Properties of hydrogel | Compressive elastic modulus (MPa) | 0.15 | 0.8 | 2.0 | 0.45 |
| | 80% strain compressive stress (MPa) | 0.8 | 12 | 20 | 6.3 |

TABLE 3

| Component (part by mass) | | Comp. Ex. 1 |
|---|---|---|
| Three-dimensional object forming liquid No. | | 9 |
| Hydrogel No. | | 9 |
| Layered mineral | XLG | 8 |
| Monofunctional monomer 1 | DMAA | 20 |
| Monofunctional monomer 2 | IPAM | — |
| Multifunctional monomer | MBAA | — |
| Surfactant | Na dodecyl sulfate | 2 |
| Photopolymerization initiator liquid | IRGACURE 184 | 0.5 |
| Thermal polymerization initiator liquid 1 | Na peroxo disulfate | 5 |
| Thermal polymerization initiator liquid 2 | VA-067 | — |
| water | Pure water | 195 |
| Properties of three-dimensional object forming liquid | Viscosity (mPa · s) | 6.5 |
| | Surface tension (mN/m) | 30.9 |
| Properties of hydrogel | Compressive elastic modulus (MPa) | 0.1 |
| | 80% strain compressive stress (MPa) | 0.8 |

Details of the materials used in Table 1 to Table 3 are as follows.

Layered mineral: XLG: a synthetic hectorite (LAPONITE XLG manufactured by Rock Wood Co., Ltd.) having a composition of $[Mg_{5.34}Li_{0.66}Si_8O_{20}(OH)_4]Na^-_{0.66}$ Monofunctional monomer 1: DMAA: N,N-dimethyl acrylamide (manufactured by Wako Pure Chemical Industries, Ltd.)

Monofunctional monomer 2: IPAM: N-isopropyl acrylamide (manufactured by Wako Pure Chemical Industries, Ltd.)

Multifunctional monomer: MBAA: methylene bis acrylamide (manufactured by Wako Pure Chemical Industries, Ltd.)

Photopolymerization initiator liquid (IRGACURE 184 (2 parts by mass)/ethanol (98 parts by mass))

Thermal polymerization initiator liquid 1 (Na peroxo disulfate (2 parts by mass)/water (98 parts by mass))

Thermal polymerization initiator liquid 2 (VA-067 (2 parts by mass)/water (98 parts by mass))

Example 9

A three-dimensional object as illustrated in FIG. 4A and FIG. 4B were produced using the three-dimensional object forming liquid set presented in Table 4 and the three-dimensional object forming apparatus illustrated in FIG. 2.

First, the three-dimensional object forming liquid 1 as the first liquid and the three-dimensional object forming liquid 4 as the second liquid were filled in two tanks leading to inkjet heads (MH2420 manufactured by Ricoh Industry Company, Ltd.) of the three-dimensional object forming apparatus. The two kinds of three-dimensional object forming liquids were jetted from the respective inkjet heads, to thereby form films. The first liquid and the second liquid were jetted to different positions.

Next, the films were irradiated with a light volume of 350 mJ/cm$^2$ by an ultraviolet ray-emitting device (SPOT CURE SP5-250DB manufactured by Ushio Inc.), and thereby cured. These series of steps were repeated, to thereby form a three-dimensional object 1.

The obtained three-dimensional object 1 included a region B made of the hydrogel 4 thereinside, and a region A made of the hydrogel 1 outside the region B.

A three-dimensional object structure of the obtained three-dimensional object 1 was evaluated as below. The result is presented in Table 5.

<Structure of Three-Dimensional Object>

A: The three-dimensional object was formed of two regions A and B different in elastic modulus illustrated in FIG. 4A and FIG. 4B.

B: The three-dimensional object was formed of two regions A and B different in elastic modulus illustrated in FIG. 4A and FIG. 4B, but would easily collapse during transportation, and was problematic as a three-dimensional object.

C: The three-dimensional object was not formed of two regions A and B different in elastic modulus illustrated in FIG. 4A and FIG. 4B.

Example 10

Three-dimensional object formation of a three-dimensional object 2 was performed in the same manner as in Example 9, except that unlike in Example 9, the three-dimensional object forming liquid 2 was used as the first liquid and the three-dimensional object forming liquid 4 was used as the second liquid as presented in Table 4. The structure of the three-dimensional object was evaluated in the same manner as in Example 9. The result is presented in Table 5.

Example 11

Three-dimensional object formation of a three-dimensional object 3 was performed in the same manner as in Example 9, except that unlike in Example 9, the three-dimensional object forming liquid 3 was used as the first liquid and the three-dimensional object forming liquid 4 was used as the second liquid as presented in Table 4. The structure of the three-dimensional object was evaluated in the same manner as in Example 9. The result is presented in Table 5.

Example 12

Formation of a three-dimensional object 4 and a support member was performed using the three-dimensional object forming liquid 1 as the first liquid, the three-dimensional object forming liquid 4 as the second liquid, and the hard formed body liquid 1 as the fourth liquid as presented in Table 4 unlike in Example 9. The structure of the three-dimensional object was evaluated in the same manner as in Example 9. The result is presented in Table 5.

Example 13

Three-dimensional object formation of a three-dimensional object 5 was performed in the same manner as in Example 9, except that unlike in Example 9, the three-dimensional object forming liquid 5 was used as the first liquid and the three-dimensional object forming liquid 4 was used as the second liquid as presented in Table 4. The structure of the three-dimensional object was evaluated in the same manner as in Example 9. The result is presented in Table 5.

Example 14

Three-dimensional object formation of a three-dimensional object 6 was performed in the same manner as in Example 9, except that unlike in Example 9, the three-dimensional object forming liquid 6 was used as the first liquid and the three-dimensional object forming liquid 4 was used as the second liquid as presented in Table 4. The structure of the three-dimensional object was evaluated in the same manner as in Example 9. The result is presented in Table 5.

Example 15

Three-dimensional object formation of a three-dimensional object 7 was performed in the same manner as in Example 9, except that unlike in Example 9, the three-dimensional object forming liquid 7 was used as the first liquid and the three-dimensional object forming liquid 4 was used as the second liquid as presented in Table 4. The structure of the three-dimensional object was evaluated in the same manner as in Example 9. The result is presented in Table 5.

Example 16

Three-dimensional object formation of a three-dimensional object 8 was performed using the three-dimensional object forming liquid 1 as the first liquid and the three-dimensional object forming liquid 8 as the second liquid as presented in Table 4 unlike in Example 9, by repetition of curing of the three-dimensional object forming liquid 1 by irradiation by an ultraviolet ray-emitting device and curing of the three-dimensional object forming liquid 8 by heating at 80° C. by an infrared ray-emitting device as in Example 8. The structure of the three-dimensional object was evaluated in the same manner as in Example 9. The result is presented in Table 5.

Example 17

Three-dimensional object formation of a three-dimensional object 9 was performed using the three-dimensional object forming liquid 8 as the first liquid and the three-dimensional object forming liquid 1 as the second liquid as presented in Table 4 unlike in Example 9, by repetition of curing of the three-dimensional object forming liquid 1 by irradiation by an ultraviolet ray-emitting device and curing of the three-dimensional object forming liquid 8 by heating at 80° C. by an infrared ray-emitting device as in Example 8. The structure of the three-dimensional object was evaluated in the same manner as in Example 9. The result is presented in Table 5.

Comparative Example 2

Three-dimensional object formation of a three-dimensional object 10 and formation of a support member were performed in the same manner as in Example 9, except that unlike in Example 9, the three-dimensional object forming liquid 9 was used as the first liquid, the three-dimensional object forming liquid 4 was used as the second liquid, and the hard formed body liquid 1 was used as the fourth liquid as presented in Table 4. The structure of the three-dimensional object was evaluated in the same manner as in Example 9. The result is presented in Table 5.

Comparative Example 3

An internal structure was formed beforehand using a mold and the three-dimensional object forming liquid 4 as the second liquid. The internal structure was set in a mold, the three-dimensional object forming liquid 1 as the first liquid was poured into the mold, and the mold was capped with quartz glass to be airtightly closed They were photo-cured in the same manner as in Example 9. As a result, the region B that was to form the central shape could not be fixed at the predetermined position but fell down, and a three-dimensional object could not be produced.

Comparative Example 4

Three-dimensional object formation of a three-dimensional object 11 was performed in the same manner as in Example 9, except that unlike in Example 9, only one kind of a three-dimensional object forming liquid, which was the three-dimensional object forming liquid 1, was used as presented in Table 4. The structure of the three-dimensional object was evaluated in the same manner as in Example 9. The result is presented in Table 5.

TABLE 4

| | Three-dimensional object forming liquid set | | |
|---|---|---|---|
| | Three-dimensional object forming liquid No. | | Hard formed body liquid No. |
| | First liquid | Second liquid | Fourth liquid |
| Ex. 9 | 1 | 4 | — |
| Ex. 10 | 2 | 4 | — |
| Ex. 11 | 3 | 4 | — |
| Ex. 12 | 1 | 4 | 1 |
| Ex. 13 | 5 | 4 | — |
| Ex. 14 | 6 | 4 | — |
| Ex. 15 | 7 | 4 | — |
| Ex. 16 | 1 | 8 | — |
| Ex. 17 | 8 | 1 | — |
| Comp. Ex. 2 | 9 | 4 | 1 |
| Comp. Ex. 3 | 1 (mold) | 4 (mold) | — |
| Comp. Ex. 4 | 1 | 1 | — |

TABLE 5

| | Region A of FIGS. 4 | | Region B of FIGS. 4 | | |
|---|---|---|---|---|---|
| | Hydrogel | 80% strain compressive stress (MPa) | Hydrogel | 80% strain compressive stress (MPa) | Structure of three-dimensional object |
| Ex. 9 | Hydrogel 1 | 3.2 | Hydrogel 4 | 6.0 | A |
| Ex. 10 | Hydrogel 2 | 1.8 | Hydrogel 4 | 6.0 | A |
| Ex. 11 | Hydrogel 3 | 1.2 | Hydrogel 4 | 6.0 | A |
| Ex. 12 | Hydrogel 1 | 3.2 | Hydrogel 4 | 6.0 | A |
| Ex. 13 | Hydrogel 5 | 0.8 | Hydrogel 4 | 6.0 | A |
| Ex. 14 | Hydrogel 6 | 12 | Hydrogel 4 | 6.0 | A |
| Ex. 15 | Hydrogel 7 | 20 | Hydrogel 4 | 6.0 | A |
| Ex. 16 | Hydrogel 1 | 3.2 | Hydrogel 8 | 6.3 | A |
| Ex. 17 | Hydrogel 8 | 6.3 | Hydrogel 1 | 3.2 | A |
| Comp. Ex. 2 | Hydrogel 9 | 0.8 | Hydrogel 4 | 6.0 | B |
| Comp. Ex. 3 | Hydrogel 1 | 3.2 | Hydrogel 4 | 6.0 | Unmeasurable |
| Comp. Ex. 4 | Hydrogel 1 | 3.2 | Hydrogel 1 | 3.2 | C |

Preparation Example 1

<Preparation of First Liquid or Second Liquid (Three-Dimensional Object Forming Liquid) 1-1>

First, while the pure water (195 parts by mass) was stirred, a synthetic hectorite (LAPONITE XLG manufactured by Rock Wood Co., Ltd.) having a composition of [$Mg_{5.34}Li_{0.66}Si_8O_{20}(OH)_4$]$Na^-_{0.66}$ as a layered mineral (16 parts by mass) was added thereto little by little, and they were stirred and prepared as a dispersion liquid.

Next, N,N-dimethyl acrylamide (DMAA manufactured by Wako Pure Chemical Industries, Ltd.) as a monofunctional monomer (20 parts by mass) which had been passed through an active alumina column to remove a polymerization inhibitor, and methylene bis acrylamide (MBAA manufactured by Wako Pure Chemical Industries, Ltd.) as a multifunctional monomer (0.3 parts by mass) were added to the obtained dispersion liquid. Further, sodium dodecyl sulfate (manufactured by Wako Pure Chemical Industries, Ltd.) as a surfactant (2 parts by mass) was added thereto and mixed. After this, the resultant was deaerated at reduced pressure for 10 minutes. Then, the resultant was filtered to remove impurities, etc., to thereby prepare a first liquid or a second liquid (a three-dimensional object forming liquid) 1-1.

<Storage Stability>

The obtained first liquid or second liquid 1-1 was put in a polypropylene-made wide-mouthed bottle (50 mL) and left in a constant-temperature bath of 50° C. for two weeks. After this, the bottle was taken out from the constant-temperature bath, left until it became room temperature (25° C.), and an initial viscosity (pre-storage viscosity) of the liquid was measured under 1 atm.

The first liquid or second liquid 1-1 was put in a polypropylene-made wide-mouthed bottle (50 mL) and left in a constant-temperature bath of 50° C. for two weeks. After this, the bottle was taken out from the constant-temperature bath. The first liquid or the second liquid 1-1 taken out from the constant-temperature bath was left until it become room temperature (25° C.). After this, a post-storage viscosity of the liquid was measured under 1 atm. The pre-storage viscosity and the post-storage viscosity were measured with a rotary viscometer (VISCOMATE VM-150III manufactured by Toki Sangyo Co., Ltd.).

A viscosity change rate calculated based on the obtained measurement results according to a mathematical formula 1 below, and storage stability was evaluated based on the criteria described below.

Viscosity change rate (%)=[(post-storage viscosity)−(pre-storage viscosity)]/(pre-storage viscosity)×100    [Mathematical Formula 1]

[Evaluation Criteria]

A: The viscosity change rate was 10% or less.

B: The viscosity change rate was 20% or less but greater than 10%.

C: The viscosity change rate was greater than 20%.

The measurement results of the pre-storage viscosity and post-storage viscosity, and the evaluation results of the storage stability are presented in Table 6.

Preparation Examples 2 and 4 to 5

<Preparation of First Liquids or Second Liquids (Three-Dimensional Object Forming Liquids) 1-2, and 1-4 to 1-5>

The first liquids or second liquids 1-2, and 1-4 to 1-5 were prepared in the same manner as in Preparation Example 1, except that the composition and contents where changed from Preparation Example 1 to those presented in Table 6.

The storage stability of the obtained first liquids or second liquids 1-2, and 1-4 to 1-5 was evaluated in the same manner as in Preparation Example 1. The results are presented in Table 6.

Preparation Example 3

<Preparation of First Liquid or Second Liquid (Three-Dimensional Object Forming Liquid) 1-3>

First, while the pure water (195 parts by mass) was stirred, a synthetic hectorite (LAPONITE XLG manufactured by Rock Wood Co., Ltd.) having a composition of [$Mg_{5.34}Li_{0.66}Si_8O_{20}(OH)_4$]$Na^-_{0.66}$ as a layered mineral (8 parts by mass) was added thereto little by little, and they were stirred and prepared as a dispersion liquid.

Next, N-isopropyl acrylamide (IPAM manufactured by Wako Pure Chemical Industries, Ltd.) as a monofunctional monomer 2 (20 parts by mass) which had been passed through an active alumina column to remove a polymerization inhibitor, and methylene bis acrylamide (MBAA manufactured by Wako Pure Chemical Industries, Ltd.) as a multifunctional monomer (0.3 parts by mass) were added to the obtained dispersion liquid. Further, sodium dodecyl sulfate (manufactured by Wako Pure Chemical Industries, Ltd.) as a surfactant (2 parts by mass) was added thereto and mixed.

Next, while the resultant was cooled in an ice bath, the photopolymerization initiator liquid (1 part by mass), and the thermal polymerization initiator liquid 1 (10 parts by mass) were added thereto. After they were stirred and mixed, the resultant was deaerated at reduced pressure for 10 minutes. Then, the resultant was filtered to remove impurities, etc., to thereby prepare a first liquid or a second liquid (a three-dimensional object forming liquid) 1-3.

The storage stability of the obtained first liquid or second liquid 1-3 was evaluated in the same manner as in Preparation Example 1. The result is presented in Table 6.

Preparation Examples 6 to 8

<Preparation of Third Liquids 3-1 to 3-3>

Third liquids 3-1 to 3-3 were prepared in the same manner as in Preparation Example 3, except that the composition and contents were changed from Preparation Example 3 to those presented in Table 7 below.

The storage stability of the obtained third liquids 3-1 to 3-3 was evaluated in the same manner as in Preparation Example 1. The results are presented in Table 7.

TABLE 6

| Component (part by mass) | | Three-dimensional object forming liquid First liquid or second liquid No. | | | | |
|---|---|---|---|---|---|---|
| | | 1-1 | 1-2 | 1-3 | 1-4 | 1-5 |
| Multifunctional monomer | MBAA | 0.3 | 0.15 | 0.3 | 0.3 | — |
| Layered mineral | XLG | 16 | 8 | 8 | — | 8 |
| Photopolymerization initiator liquid | IRGACURE 184 | — | — | 1 | — | — |
| Thermal polymerization initiator liquid 1 | Na peroxo disulfate | — | — | 10 | — | — |
| Monofunctional monomer 1 | DMAA | 20 | — | — | 20 | 20 |
| Monofunctional monomer 2 | IPAM | — | 20 | 20 | — | — |
| Surfactant | Na dodecyl sulfate | 2 | 2 | 2 | 2 | 2 |
| water | Pure water | 195 | 195 | 195 | 195 | 195 |
| Storage stability | Initial viscosity (mPa · s) | 12.4 | 8.8 | 13.3 | 4.5 | 5.8 |
| | Storage viscosity (mPa · s) | 13.7 | 9.5 | 16.6 | 4.9 | 6.1 |
| | Evaluation | B | A | C | A | A |

TABLE 7

| Component (part by mass) | | Third liquid No. | | |
|---|---|---|---|---|
| | | 3-1 | 3-2 | 3-3 |
| Multifunctional monomer | MBAA | — | 0.3 | — |
| Layered mineral | XLG | — | — | — |
| Photopolymerization initiator liquid | IEGACURE 184 | 1.5 | 1 | 1.5 |
| Thermal polymerization initiator liquid 1 | Na peroxo disulfate | 15 | 10 | 15 |
| Monofunctional monomer 1 | DMAA | — | 20 | — |
| Monofunctional monomer 2 | IPAM | — | — | 20 |
| Surfactant | Na dodecyl sulfate | 2 | 2 | 2 |
| water | Pure water | 195 | 195 | 195 |
| Storage stability | Initial viscosity (mPa · s) | 7.2 | 9.2 | 9.9 |

TABLE 7-continued

| Component (part by mass) | Third liquid No. | | |
|---|---|---|---|
| | 3-1 | 3-2 | 3-3 |
| Storage viscosity (mPa · s) | 7.7 | 10.3 | 10.6 |
| Evaluation | A | B | A |

Details of the materials used in Table 6 and Table 7 are as follows.

Layered mineral: XLG: a synthetic hectorite (LAPONITE XLG manufactured by Rock Wood Co., Ltd.) having a composition of $[Mg_{5.34}Li_{0.66}Si_8O_{20}(OH)_4]Na^-_{0.66}$ Monofunctional monomer 1: DMAA: N,N-dimethyl acrylamide (manufactured by Wako Pure Chemical Industries, Ltd.)

Monofunctional monomer 2: IPAM: N-isopropyl acrylamide (manufactured by Wako Pure Chemical Industries, Ltd.)

Multifunctional monomer: MBAA: methylene bis acrylamide (manufactured by Wako Pure Chemical Industries, Ltd.)

Photopolymerization initiator liquid (IRGACURE 184 (2 parts by mass)/ethanol (98 parts by mass))

Thermal polymerization initiator liquid 1 (Na peroxo disulfate (2 parts by mass)/water (98 parts by mass))

Examples 18 to 20 and 22

Three-dimensional objects were produced using the three-dimensional object forming liquid sets presented in Table 8 and the three-dimensional object forming apparatus illustrated in FIG. 2.

Specifically, first, the first liquid or the second liquid, and the second liquid presented in Table 8 were filled in two tanks leading to inkjet heads (MH2420 manufactured by Ricoh Industry Company, Ltd.) of the three-dimensional object forming apparatus. The two kinds of liquids were jetted from the respective inkjet heads, to thereby form films. The third liquid was jetted to the same position to which the first liquid or the second liquid was jetted.

Next, the films were irradiated with ultraviolet rays having a light volume presented in Table 8 by an ultraviolet ray-emitting device (SPOT CURE SP5-250DB manufactured by Ushio Inc.), and thereby cured. These series of steps were repeated, to thereby form three-dimensional objects of Examples 18 to 20 and 22.

Example 21

A three-dimensional object of Example 21 was produced in the same manner as in Examples 18 to 20 and 22, except that as presented in Table 8, the hard formed body liquid 1 was used in the support member-jetting head unit 31 illustrated in FIG. 2 as the three-dimensional object forming liquid set to form the three-dimensional object and a support member.

Next, an 80% strain compressive stress of the obtained three-dimensional objects of Examples 18 to 22 was measured in the manner described below. The results are presented in Table 8.

<80% Strain Compressive Stress Evaluation (Compression Test)>

A load cell of 1 kN and a compression jig for 1 kN were set on a universal tester (AG-I manufactured by Shimadzu Corporation), and the three-dimensional object having a shape of 10 mm×10 mm×10 mm was placed thereon. A stress corresponding to a compression imposed on the load cell was recorded on a computer, and a stress corresponding to an amount of displacement was plotted.

When the three-dimensional object was broken, the compressive stress when it was broken was obtained as a maximum value. When the three-dimensional object was not broken, the measurement was obtained as an 80% strain compressive stress. The values were evaluated based on the criteria below.

[Evaluation Criteria]

A: The 80% strain compressive stress of the three-dimensional object was 1.0 MPa or greater.

B: The 80% strain compressive stress of the three-dimensional object was 0.4 MPa or greater but less than 1.0 MPa.

C: The 80% strain compressive stress of the three-dimensional object was less than 0.4 MPa.

TABLE 8

|  |  | Ex. 18 | Ex. 19 | Ex. 20 | Ex. 21 | Ex. 22 |
|---|---|---|---|---|---|---|
| Three-dimensional object forming liquid set | First liquid No. | 1-1 | 1-1 | 1-2 | 1-1 | 1-1 |
|  | Second liquid No. | — | — | — | — | — |
|  | Third liquid No. | 3-1 | 3-2 | 3-3 | 3-1 | 3-1 |
|  | Fourth liquid No. | — | — | — | 1 | — |
| Light volume during curing | mJ/cm$^2$ | 350 | 350 | 350 | 350 | 280 |
| 80% strain compressive stress | Measured value (MPa) | 3.4 | 2.5 | 2.8 | 3.4 | 3.0 |
|  | Evaluation | A | A | A | A | A |

Example 23

An organ model of a porcine liver was formed using the three-dimensional object forming liquid 1, the three-dimensional object forming liquid 4, and the hard formed body liquid 1 as in the three-dimensional object forming liquid set of Example 12, and with the three-dimensional object forming apparatus illustrated in FIG. 2, based on three-dimensional model data of the liver obtained by performing data processing according to the description in JP-B No. 5239037.

The obtained liver organ model had similar shape, touch, and elasticity to those of a real porcine liver.

Aspects of the present invention are as follows, for example.

<1> A three-dimensional object producing method, including:
a first step of forming a film by delivering a first liquid as a hydrogel precursor including at least a multifunctional monomer; and
a second step of curing the film formed in the first step,
wherein the first step and the second step are repeated a plurality of times.

<2> A three-dimensional object producing method, including:
a first step of forming a film by delivering a first liquid as a hydrogel precursor including at least a multifunctional monomer;
a third step of forming a film by delivering a second liquid including a hydrogel precursor and compositionally different from the first liquid to a different position from where the first liquid is delivered; and
a fourth step of curing the films formed in the first step and the third step respectively,
wherein the first step, the third step, and the fourth step are repeated a plurality of times.

<3> The three-dimensional object producing method according to <1>, further including:
a fifth step of delivering a third liquid including at least a polymerization initiator to the same position as where the first liquid is delivered.

<4> The three-dimensional object producing method according to <2>, further including:
a sixth step of delivering a third liquid including at least a polymerization initiator to the same position as at least any one of where the first liquid is delivered and where the second liquid is delivered.

<5> The three-dimensional object producing method according to <4>,
wherein a content of the polymerization initiator in the third liquid is greater than a content of a polymerization initiator in at least any one of the first liquid and the second liquid.

<6> The three-dimensional object producing method according to any one of <2>, <4>, and <5>,
wherein at least any one of the first liquid and the second liquid is free of a polymerization initiator.

<7> The three-dimensional object producing method according to any one of <2> and <4> to <6>,
wherein at least any one of the first liquid and the second liquid includes a polymerization initiator.

<8> The three-dimensional object producing method according to any one of <3> to <5> and <7>,
wherein the polymerization initiator is any one of a photopolymerization initiator and a thermal polymerization initiator.

<9> The three-dimensional object producing method according to any one of <1> to <8>,
wherein the hydrogel precursor includes at least a layered mineral dispersed in water in a state of single layers.

<10> The three-dimensional object producing method according to any one of <2> and <4> to <9>,
wherein at least any one of the first liquid and the second liquid includes a monofunctional monomer.

<11> The three-dimensional object producing method according to any one of <2> and <4> to <10>,
wherein the second liquid includes a multifunctional monomer.

<12> The three-dimensional object producing method according to any one of <9> to <11>,
wherein the layered mineral is a synthetic hectorite.

<13> The three-dimensional object producing method according to any one of <1> to <12>,
wherein the multifunctional monomer is an active energy ray-curable monomer.

<14> The three-dimensional object producing method according to any one of <10> to <13>,
wherein a homopolymer of the monofunctional monomer or the multifunctional monomer is water-soluble.

<15> The three-dimensional object producing method according to <1> or <2>,
wherein a method for delivering the first liquid is any one of an inkjet method and a dispenser method.
<16> The three-dimensional object producing method according to <2>,
wherein a method for delivering the second liquid is any one of an inkjet method and a dispenser method.
<17> The three-dimensional object producing method according to <3> or <4>,
wherein a method for delivering the third liquid is any one of an inkjet method and a dispenser method.
<18> A three-dimensional object producing method, including:
a first step of forming a film by delivering a first liquid;
a third step of forming a film by delivering a second liquid to a different position from where the first liquid is delivered; and
a fourth step of curing the films formed in the first step and the third step respectively,
wherein the first step, the third step, and the fourth step are repeated a plurality of times, and
wherein the first liquid and the second liquid are cured to hydrogels different from each other in elastic modulus.
<19> The three-dimensional object producing method according to <18>, further including:
a sixth step of delivering a third liquid including at least a polymerization initiator to the same position as at least any one of where the first liquid is delivered and where the second liquid is delivered.
<20> The three-dimensional object producing method according to <18> or <19>,
wherein an 80% strain compressive stress of one of the hydrogels is 0.4 MPa or greater.
<21> The three-dimensional object producing method according to any one of <18> to <20>, further including:
a seventh step of forming a film by delivering a fourth liquid to become a hard formed body for supporting a three-dimensional object made of the hydrogels to a different position from at least any one of where the first liquid is delivered and where the second liquid is delivered.
<22> A three-dimensional object forming liquid,
wherein the three-dimensional object forming liquid is a hydrogel precursor including at least a multifunctional monomer.
<23> The three-dimensional object forming liquid according to <22>,
wherein a viscosity of the three-dimensional object forming liquid is from 3 mPa·s to 20 mPa·s at 25° C., and an 80% strain compressive stress of a hydrogel obtained by curing the three-dimensional object forming liquid is 0.4 MPa or greater.
<24> A three-dimensional object forming liquid set, including:
a first liquid as a hydrogel precursor including at least a multifunctional monomer; and
a second liquid including a hydrogel precursor and compositionally different from the first liquid.
<25> The three-dimensional object forming liquid set according to <24>, further including:
a third liquid greater than at least any one of the first liquid and the second liquid in a content of a polymerization initiator.
<26> The three-dimensional object forming liquid set according to <25>,
wherein a viscosity change rate of the third liquid before and after the third liquid is left at 50° C. for two weeks is 20% or less.
<27> The three-dimensional object forming liquid set according to any one of <24> to <26>,
wherein at least any one of the first liquid and the second liquid is free of a polymerization initiator.
<28> The three-dimensional object forming liquid set according to any one of <24> to <26>,
wherein at least any one of the first liquid and the second liquid includes a polymerization initiator.
<29> The three-dimensional object forming liquid set according to any one of <26> to <28>,
wherein the polymerization initiator is any one of a photopolymerization initiator and a thermal polymerization initiator.
<30> The three-dimensional object forming liquid set according to any one of <24> to <29>,
wherein the first liquid and the second liquid are cured to hydrogels different from each other in elastic modulus.
<31> A three-dimensional object, including at least:
a first region made of a first hydrogel; and
a second region made of a second hydrogel different from the first hydrogel in elastic modulus,
wherein an 80% strain compressive stress of any one of the first hydrogel and the second hydrogel is 0.4 MPa or greater.
<32> The three-dimensional object according to <31>,
wherein compressive elastic modulus of any one of the first hydrogel and the second hydrogel is 0.3 MPa or greater.
<33> The three-dimensional object according to <31> or <32>,
wherein the first region encloses the second region therein completely.
<34> The three-dimensional object according to any one of <31> to <33>,
wherein the hydrogels are hydrogels including water in a three-dimensional network structure formed by a water-soluble organic polymer and dispersed single layers of a layered mineral being combined with each other.
<35> The three-dimensional object according to any one of <31> to <34>,
wherein the three-dimensional object is used as an organ model.

The three-dimensional object producing method according to any one of <1> to <21>, the three-dimensional object forming liquid according to <22> or <23>, the three-dimensional object forming liquid set according to any one of <24> to <30>, and the three-dimensional object according to any one of <31> to <35> aim to solve the various conventional problems described above and achieve the object described below. That is, the three-dimensional object producing method, the three-dimensional object forming liquid, the three-dimensional object forming liquid set, and the three-dimensional object aim to provide a three-dimensional object producing method, a three-dimensional object forming liquid, a three-dimensional object forming liquid set, and the three-dimensional object that enable easily and efficient production of complicated fine three-dimensional objects represented by organ models, etc.

This application claims priority to Japanese application No. 2014-211658, filed on Oct. 16, 2014 and incorporated herein by reference, and Japanese application No. 2015-120796, filed on Jun. 16, 2015 and incorporated herein by reference.

What is claimed is:

1. A three-dimensional object forming liquid,
wherein the three-dimensional object forming liquid is a hydrogel precursor that comprises a multifunctional monomer, and
wherein a viscosity of the three-dimensional object forming liquid is from 3 mPa·s to 20 mPa·s at 25° C., and an 80% strain compressive stress of a hydrogel obtained by curing the three-dimensional object forming liquid is 0.4 MPa or greater.

2. A three-dimensional object forming liquid set, comprising:
a first liquid that is the three-dimensional object forming liquid according to claim 1; and
a second liquid that comprises a hydrogel precursor and is compositionally different from the three-dimensional object forming liquid.

3. A three-dimensional object produced by a three-dimensional object producing method comprising:
forming of a film by delivering a first liquid;
another forming of a film by delivering a second liquid to a different position from where the first liquid is delivered; and
curing of the films formed in the forming and the another forming respectively,
wherein the forming, the another forming, and the curing are repeated a plurality of times, and
wherein the first liquid and the second liquid are cured to hydrogels different from each other in elastic modulus,
the three-dimensional object comprising:
a first region made of a first hydrogel; and
a second region made of a second hydrogel different from the first hydrogel in elastic modulus,
wherein an 80% strain compressive stress of any one of the first hydrogel and the second hydrogel is 0.4 MPa or greater.

4. The three-dimensional object according to claim 3,
wherein compressive elastic modulus of any one of the first hydrogel and the second hydrogel is 0.3 MPa or greater.

5. The three-dimensional object according to claim 3,
wherein the first region encloses the second region therein completely.

6. The three-dimensional object according to claim 3,
wherein the hydrogels are hydrogels that comprise water in a three-dimensional network structure formed by a water-soluble organic polymer and dispersed single layers of a layered mineral being combined with each other.

7. An organ model,
wherein the organ model is the three-dimensional object according to claim 3.

* * * * *